United States Patent
Suh

(10) Patent No.: US 7,912,303 B2
(45) Date of Patent: *Mar. 22, 2011

(54) APPARATUS AND METHOD FOR GENERATING THUMBNAIL IMAGES

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 930 days.

This patent is subject to a terminal disclaimer.

(21) Appl. No.: 11/773,366

(22) Filed: Jul. 3, 2007

(65) Prior Publication Data

US 2008/0016469 A1    Jan. 17, 2008

Related U.S. Application Data

(63) Continuation of application No. 10/331,671, filed on Dec. 27, 2002, now Pat. No. 7,257,261.

(30) Foreign Application Priority Data

Dec. 28, 2001  (KR) .................................. 2001-87075

(51) Int. Cl.
*G06K 9/36* (2006.01)
(52) U.S. Cl. ........................................ 382/236; 382/168
(58) Field of Classification Search .................. 382/168, 382/170, 232, 233, 235–236; 375/240.2; 709/217; 715/838; 725/129
See application file for complete search history.

(56) References Cited

U.S. PATENT DOCUMENTS 7,257,261 B2 * 8/2007 Suh .............................. 382/236

* cited by examiner

*Primary Examiner* — Duy M Dang
(74) *Attorney, Agent, or Firm* — Lee, Hong, Degerman, Kang & Waimey

(57) ABSTRACT

The present invention discloses an apparatus for automatically generating thumbnail images for a video browser and a video recording and reproducing device, and a method therefor. A difference between histograms of two DC images of a current frame I picture and a previous frame I picture is calculated and compared with a predetermined reference value for deciding a stabilization section. When the difference between the histograms of the current I picture DC image and the previous I picture DC image does not exceed the reference value, the corresponding I picture DC image is outputted as the thumbnail image. Here, a blank test is executed to exclude a dark original image whose contents are indistinguishable. Only the DC image of the I picture passing through the blank test is outputted as the thumbnail image.

30 Claims, 3 Drawing Sheets

APPARATUS AND METHOD FOR GENERATING THUMBNAIL IMAGES

CROSS-REFERENCE TO RELATED APPLICATIONS

This application is a continuation of U.S. application Ser. No. 10/331,671, filed Dec. 27, 2002, now U.S. Pat. No. 7,257,261, which pursuant to 35 U.S.C. §119(a), claims the benefit of earlier filing date and right of priority to Korean Application No. 2001-87075, filed Dec. 28, 2001, the contents of which are hereby incorporated by reference herein in its entirety.

BACKGROUND OF THE INVENTION

1. Field of the Invention

The present invention relates to an apparatus and a method for automatically generating thumbnail images in motion picture video contents.

2. Description of the Related Art

Thumbnail images are used to provide a variety of functions, such as efficient contents summarization, storyboards, key frame generation and program guide in a personal video recorder (PVR) of a digital TV or a video browser of a video library.

The thumbnail images which display a specific video frame in a smaller size than an original size are used in various fields to summarize video contents recorded in the PVR into a few small pictures or to generate key frames for video indexing or representative images for program guidance.

Conventional methods for generating thumbnail images include (1) a method for decoding a video frame encoded by MPEG and reducing the restored frame, (2) and a method using a DC value of an I picture.

In the former, the whole pixels of the corresponding frame must be decoded, and thus a variable length decoder is required, which increases hardware load.

In the latter, the variable length decoder is not necessary because thumbnail images are generated by using the DC value of the I picture. The latter method has been more widely used due to its simple construction.

The DC value will now be explained.

Coefficients of a frequency region transformed by DCT in an image encoding process are classified into DC or AC coefficients according to the related frequency. Here, the DC value, which is meant as a coefficient when the frequency is '0' implies an average.

That is, the DC values of each block in 8×8 block DCT are equivalent to averages of brightness or chrominance prior to the DCT.

Since the thumbnail images allow users to summarize and display the whole or specific section video contents in a smaller size than an original size, namely representative images of low resolution, the video frame composing the thumbnail images must be free from noise, blank and overlap due to scene transition or shot transition, and must be able to clearly transmit information of the whole or specific section video contents to the users. Therefore, avoided are unclear images influenced by blur due to camera movement such as rapid zoom and object movement.

In the case that the thumbnail images are generated in all I pictures of video, a large volume of thumbnail images are generated to increase load of a storing medium. In addition, the users have difficulties in searching wanted contents because of a lot of unnecessary thumbnail images. Considering that a number of the thumbnail images that can be displayed on one screen are restricted, it is difficult to efficiently summarize and display the whole or specific section video contents.

In order to solve the foregoing problems, there is provided a method for generating thumbnail images at a predetermined interval in a sample rate, which has been previously decided or optionally inputted by users. However, the aforementioned method, which simply restricts a number of the thumbnail images cannot overcome noise, blank and overlap of the thumbnail images.

It is thus impossible to prevent generation of unnecessary thumbnail images which are not suitable for information transmission.

There has also been taught a method for designating a section for generating thumbnail images in video. However, users must manually search the corresponding section.

Moreover, the conventional method for generating the thumbnail images does not consider a concept of scenes.

That is, when the thumbnail images are generated in every I picture, generated at a predetermined time interval in a designated sample rate, or generated in a section designated by users, a few similar thumbnail images are extracted from the same scene. It means that the users are provided with unnecessary thumbnail images having low information transmission ability. As a result, the representative images corresponding to each scene are not efficiently extracted.

SUMMARY OF THE INVENTION

It is, therefore, a primary object of the present invention to provide an apparatus for generating thumbnail images and a method therefore, which can allow users to automatically generate clear and suggestive thumbnail images having high information transmission ability.

Another object of the present invention is to provide an apparatus for generating thumbnail images and a method therefor which can allow users to generate clear thumbnail images having high information transmission ability by excluding meaningless images generated due to noise, overlap by scene transition or excessive zoom from the thumbnail images.

Yet another object of the present invention is to provide an apparatus for generating thumbnail images and a method therefor which can generate clear thumbnail images representing a corresponding section by generating the thumbnail images in a stabilization section after the scene transition of motion picture video.

Yet another object of the present invention is to provide an apparatus for generating thumbnail images and a method therefor which can generate clear thumbnail images having high information transmission ability by excluding unclear images having low information transmission ability from the thumbnail images by verifying whether the thumbnail images can represent the whole video or specific section.

To achieve the above objects, there is provided an apparatus for generating thumbnail images including: a histogram extracting means for extracting histograms of a preceding image and a succeeding image in time sequence; a stabilization section deciding means for deciding whether a section which the corresponding image belongs to is a stabilization section by using a difference of the extracted histograms; a blank test means for deciding whether to adopt an image which is included in the stabilization section as a thumbnail image; and an output means for excluding the corresponding image from thumbnail image generation, or selecting and outputting the image as the thumbnail image according to the blank test result.

According to another aspect of the present invention, an apparatus for generating thumbnail images includes: a DC image extracting means for extracting DC images of a current input I picture and a previous input I picture; a histogram extracting means for extracting histograms of the current I picture DC image and the previous I picture DC image; a histogram comparing means for calculating a difference between the extracted histograms; a stabilization section deciding means for deciding whether the current section is a stabilization section by using the difference of the extracted histograms; a blank discriminating means for performing a blank test to separate indistinguishable images from the images of the stabilization section; and an output means for outputting the corresponding image as the thumbnail image according to the blank discrimination result.

According to another aspect of the present invention, a method for generating thumbnail images includes the steps of: detecting scene transition by calculating difference between histograms of image frames; selecting a thumbnail image candidate in the image section where the scene transition has happened by using the difference between the thumbnail histograms; performing a blank test on the selected thumbnail image candidate; and deciding whether to generate the thumbnail image from the corresponding image according to the blank test result.

According to another aspect of the present invention, a method for generating thumbnail images includes the steps of: comparing histograms of a current input image and a previous input image, and calculating difference between the histograms; comparing the difference between the histograms with a predetermined threshold value, and selecting the corresponding image as a thumbnail image candidate when the difference does not exceed the threshold value; deciding whether the thumbnail image candidate passing through a blank test belongs to a stabilization section; generating the thumbnail image of the first I picture of the stabilization section; and preventing the thumbnail image from being generated in the succeeding I pictures of the stabilization section.

In accordance with the present invention, the images degraded due to noise, overlap by scene transition and blank by illuminations are excluded from thumbnail image generation, so that the meaningful thumbnail images can be generated based on scenes.

Moreover, the present invention can be used in a variety of application fields relating to video stream contents summarization, program guidance, storyboards, and suggestive video information transmission in a PVR of a digital TV, video library, etc.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
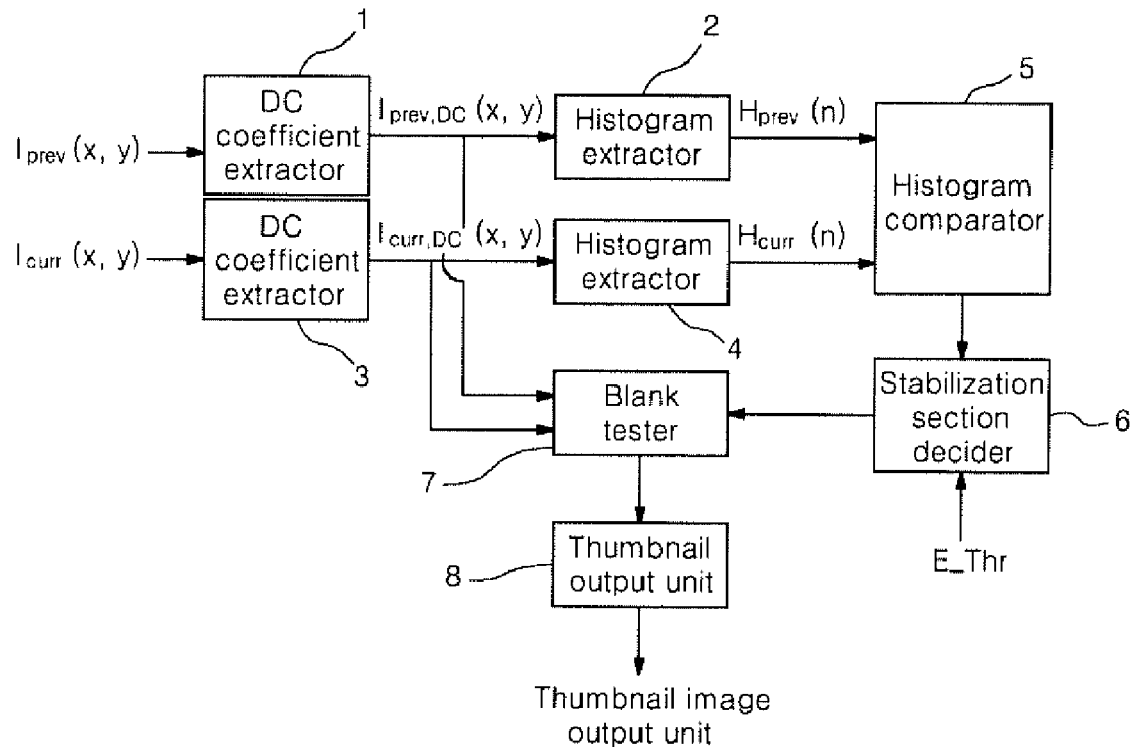
FIG. 1 is a block diagram illustrating an apparatus for generating thumbnail images in accordance with a preferred embodiment of the present invention.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram illustrating an apparatus for generating thumbnail images in accordance with a preferred embodiment of the present invention. The apparatus for generating the thumbnail images includes a DC coefficient extractor 1 for receiving a previous I picture $I_{prev}(x,y)$ and extracting a DC image $I_{prev,DC}(x,y)$, a histogram extractor 2 for extracting a histogram $H_{prev}(n)$ from the DC image $I_{prev,DC}(x,y)$, a DC coefficient extractor 3 for receiving a current I picture $I_{curr}(x,y)$ and extracting a DC image $I_{curr,DC}(x,y)$, a histogram extractor 4 for extracting a histogram $H_{curr}(n)$ from the DC image $I_{curr,DC}(x,y)$, a histogram comparator 5 for comparing the histograms $H_{prev}(n)$ and $H_{curr}(n)$ and outputting an error E, a stabilization section decider 6 for deciding a stabilization section by comparing the error E with a threshold value E_Thr, a blank tester 7 for performing a blank test on the current image according to the stabilization section decision result, and a thumbnail image output unit 8 for outputting the thumbnail image according to the blank test result.

As shown in FIG. 1, the images inputted to the apparatus for generating the thumbnail images are I pictures of an MPEG encoded video stream. Generation of the thumbnail images is decided by calculating a histogram difference (error E) between the two consecutive I pictures.

In addition, hardware load is reduced by comparing the histograms of the DC images, not the whole I pictures. Actually, the thumbnail images are generated by using the DC images as they are.

That is, the thumbnail image output unit 8 selects and outputs the DC images as the thumbnail images on the basis of the blank test result.

Such DC images do not need a variable length decoder of an MPEG decoder. Since the DC images are obtained simply by parsing the DC values of the video stream instead of decoding the whole images, they do not generate hardware load.

The DC coefficient extractors 1 and 3 respectively extract the DC images from the previous frame and the current frame, namely the previous I picture and the current I picture, and the histogram extractors 2 and 4 respectively extract the histograms $H_{prev}(n)$ and $H_{curr}(n)$ from the previous I picture DC image and the current I picture DC image. The histogram comparator 5 receives the extracted histograms $H_{prev}(n)$ and $H_{curr}(n)$ and calculates the error E by following Formula 1:

$$E = \frac{1}{DC\ size} \sum_{n=1}^{N} abs(H_1(n) - H_2(n)) \quad \text{<Formula 1>}$$

Here, 'n' represents a bin of the histogram, 'N' represents a number of the bins of the histogram, and 'DC size' represents a number of the DC coefficients of the I picture or a size of the DC image.

The error E is generated between the two consecutive I pictures in the following four occasions:

1. when hard cut is generated between the two I pictures; 2. when the two I pictures overlap with each other due to gradual scene transition; 3. when image quality of at least one I picture is deteriorated due to noise; and 4. when a camera or object moves fast.

In the first case, if the scene is relatively long, the error E is relatively small.

Accordingly, the thumbnail images can be formed from the succeeding I picture of the scene, instead of the first I picture thereof.

In the other cases, most of the errors are generated due to reduction of image quality, rapid movement of the object or excessive zoom. Therefore, if the thumbnail images are generated, they are not clear and show low information transmission ability.

In accordance with the present invention, when the error E of the adjacent I picture does not exceed the predetermined threshold value E_Thr, it is designated as a stabilization section. Only the I pictures belonging to the stabilization section are determined as thumbnail image candidates.

That is, the images deteriorated due to rapid movement of the camera, noise or overlap by scene transition are excluded from the thumbnail image candidates by the above-defined stabilization section during the process for generating the thumbnail images.

The stabilization section decider 6 decides whether the current image belongs to the stabilization section by comparing the histogram error E with the threshold value E_Thr.

When the two consecutive I pictures belong to the sections of the same scene, the error E has a relatively low value. The threshold value E_Thr needs to be set up sufficiently low to detect such sections.

In accordance with the present invention, the threshold value E_Thr is set up as 0.2 on the basis of the experimental results using the MPEG video stream. The images in which noise, hard cut and overlap due to gradual scene transition have been generated can be excluded by the threshold value E_Thr.

Figure 2:
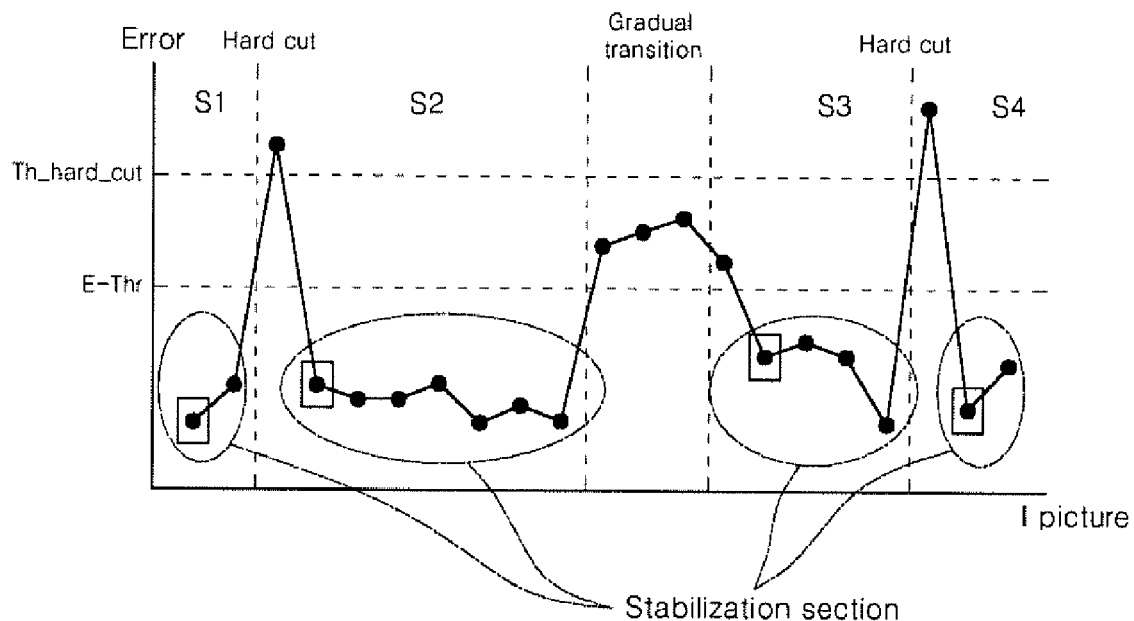
FIG. 2 shows relation between an I picture and a histogram error to explain a stabilization section in accordance with the present invention.

FIG. 2 shows an example of the motion picture analysis result using the apparatus for generating the thumbnail images in accordance with the present invention.

An error represents the histogram error between the DC image of the current I picture and the DC image of the previous I picture, and four scenes S1, S2, S3 and S4 are exemplified.

Here, Th_hard_cut which is a threshold value for deciding a hard cut is set up much larger than E_Thr.

The boundary between the scene S1 and the scene S2 shows the hard cut, and the section varied from the scene S2 to the scene S3 shows the gradual scene transition of three I pictures.

That is, the error is lower than the hard cut over the sections corresponding to three GOP (group of pictures) of the MPEG video stream, but larger than the threshold value E_Thr for deciding the stabilization section. Such an error is based on the gradual scene transition.

Still referring to FIG. 2, the time section to which the I picture corresponding to the error indicated by a circle or elliptical belongs to is defined as the stabilization section. In the stabilization section, noise, overlap and image blur are not generated. The thumbnail image is generated from the first I picture (indicated by a rectangle) of the stabilization section. That is, it is selected as the thumbnail image candidate.

The blank tester 7 performs the blank test on the first frame of the I pictures of the stabilization section.

The blank pictures imply dark pictures generated due to illuminations or other natural factors, or indistinguishable pictures generated due to special broadcasting effects (fade in, fade out, etc.).

Therefore, the blank tester 7 prevents such pictures from being generated as the thumbnail images.

The first case will now be additionally explained with reference to FIG. 2.

One of the objects of the present invention is to prevent the thumbnail images from being generated from damaged images. The damaged images imply meaningless or low quality images due to overlap of adjacent scenes in scene transition, noise and other optical reasons.

Accordingly, the thumbnail image is extracted from the I picture of the stabilization section by using the error of the adjacent I pictures.

Generation of the hard cut indicates start of a new scene, but another hard cut may be generated in the succeeding I picture.

That is, the hard cut may be generated in a few consecutive I pictures. In this case, it is recognized that a few short scenes follow one after another.

Here, it is meaningless to generate the thumbnail images from the short scenes. So as to generate the thumbnail image from the meaningful sections of the scene, the thumbnail image is generated from the first picture of the stabilization section.

That is, when the hard cut is generated between the n-th I picture and the n+1th I picture, the error between the n+1th I picture and the n-th I picture has a very high value.

Since the value of FIG. 2 indicates the error with the previous picture, the n+1th I picture becomes a starting point of the scene but does not belong to the stabilization section. Thus, the stabilization section starts from the second I pictures of each scene.

Figure 3:
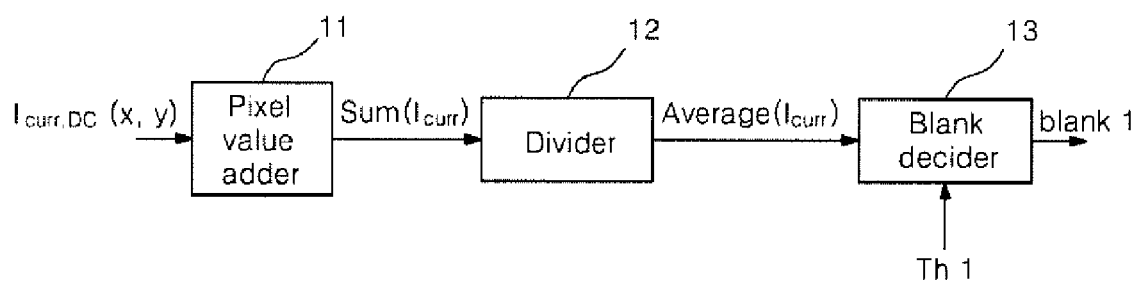
FIG. 3 is a block diagram illustrating a first example of a blank tester in accordance with the present invention.

FIG. 3 is a block diagram illustrating a first example of the blank tester 7 in accordance with the present invention. Here, the blank test is executed by using a brightness Y average of the whole pixels of the DC image of the input I picture.

As illustrated in FIG. 3, the blank tester includes a pixel value adder 11 for calculating a sum Sum($I_{curr}$) of the entire pixel values of the DC image $I_{curr,DC}(x,y)$ of the input I picture, a divider 12 for outputting an average Average($I_{curr}$) by dividing the sum of the pixel values by a pixel number, and a blank decider 13 for outputting a blank decision result blank 1 by comparing the pixel average with a threshold value Th1.

The average Average($I_{curr}$) of the brightness signals calculated by the pixel value adder 11 and the divider 12 is compared with the previously-set threshold value Th1. If the average Average($I_{curr}$) does not exceed the threshold value Th1, the current image is regarded as a blank image (BLANK=1), and if not, it is processed as the thumbnail image (BLANK=0).

When the current image is the blank image, the thumbnail image output unit 8 does not output the corresponding image $I_{curr,DC}(x,y)$ as the thumbnail image.

According to the MPEG standards, the brightness signals of the image have 220 levels from 16 to 235. Therefore, the threshold value Th1 is set up as 89, which is equivalent to '⅓(220/3+16)' of the whole levels.

Figure 4:
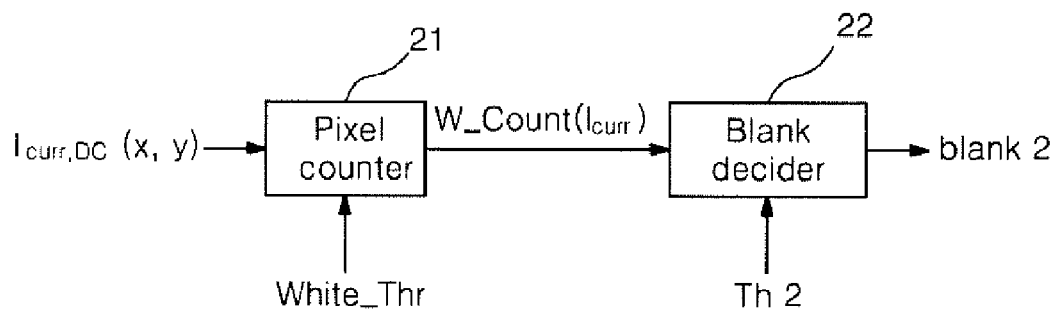
FIG. 4 is a block diagram illustrating a second example of the blank tester in accordance with the present invention.

FIG. 4 is a block diagram illustrating a second example of the blank tester 7 in accordance with the present invention, specifically a blank test using a number of white pixels of the input DC image.

As depicted in FIG. 4, the blank tester includes a pixel counter 21 for calculating the number $W\_Count(I_{curr})$ of the white pictures of the DC image $I_{curr,DC}(x,y)$ of the input I picture, and a blank decider 22 for outputting a blank decision result blank2 by comparing the pixel count value with a threshold value Th2.

Since the blank tester of FIG. 3 is based on the pixel average, it may mistakenly process an image showing a clear contrast effect, for example a meaningful object in a dark background as a blank picture.

However, the blank tester of FIG. 4 guarantees generation of the thumbnail images if a predetermined number of white pixels exist even in the dark background.

The pixel counter 21 counts the number of the white pixels of the DC image $I_{curr,DC}(x,y)$ of the input I picture. Here, the pixel counter 21 decides whether pixels are the white pixels according to a threshold value White_Thr.

That is, when the brightness signal of the DC image is larger than the threshold value White_Thr, the pixel counter 21 counts the corresponding pixels as the white pixels.

The number $W\_Count(I_{curr})$ of the white pixels is compared with the threshold value Th2 by the blank decider 22.

Accordingly, if the number $W\_Count(I_{curr})$ of the white pixels does not exceed the threshold value Th2, the corresponding image is blank-processed (BLANK=1), and if not, it is processed as the thumbnail image (BLANK=0). The blank-processed image does not generate the thumbnail image.

In the blank tester of FIG. 4, 'White_Thr=140' and 'Th2=192(3×64)' are presumed.

These values imply that brightness of 192 pixels of the DC image is over 140, which corresponds to 48 macro blocks in the original I picture.

The blank testers of FIGS. 3 and 4 can be embodied in the blank tester 7 of FIG. 1 in a single or incorporation type.

The single type blank tester was explained above, and the incorporation type blank tester needs logical constitution of 'BLANK=blank1 AND blank2'.

The blank discrimination method is performed in parallel on the current input DC image. When the two test results are all blank (BLANK1=1 AND BLANK2=1), the current input image is regarded as the blank image. Only when the test result is 'BLANK=0', the thumbnail image can be generated.

Therefore, it can prevent the meaningful image such as the image having a clear contrast effect from being excluded from the thumbnail image because its pixel average does not reach into the threshold value.

Figure 5:
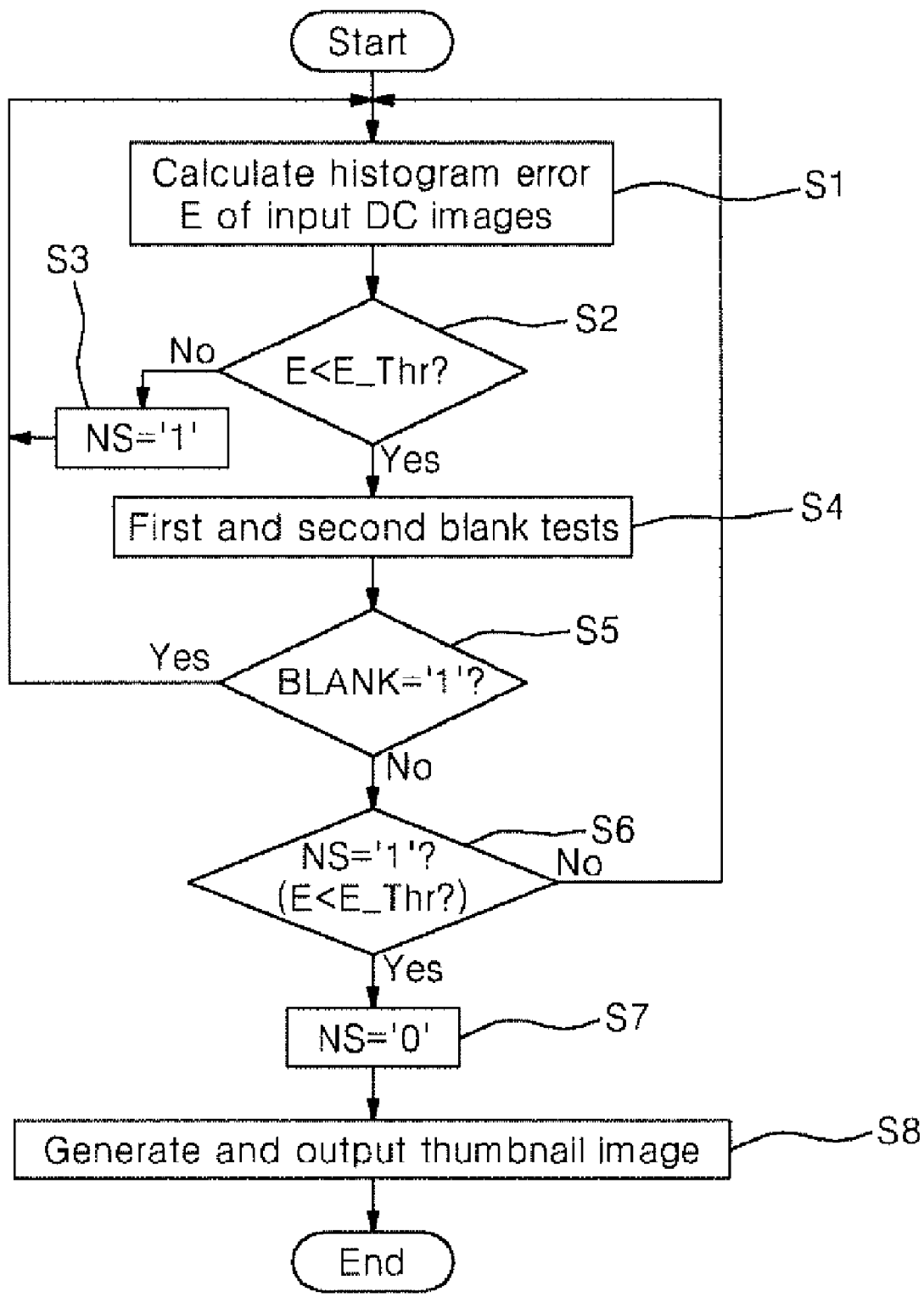
FIG. 5 is a flowchart showing sequential steps of a method for generating thumbnail images in accordance with the preferred embodiment of the present invention.

FIG. 5 is a flowchart showing sequential steps of a method for generating thumbnail images in accordance with the preferred embodiment of the present invention.

In step S1, the histogram error E between the input DC images of the I pictures is calculated.

In step S2, the histogram error E is compared with the threshold value E_Thr. When the histogram error E is larger than the threshold value E_Thr, it implies start of the new scene section. Here, a parameter NS showing start of the new scene is set up as '1' (S2 and S3).

The thumbnail image is not generated in the starting point of the new scene, and thus the routine goes back to S1.

When the histogram error E does not exceed the threshold value E_Thr, the blank test as shown in FIG. 3 or FIG. 4 is executed (S4).

The image which has not obtained the blank test result (BLANK=0) is excluded from the thumbnail image generation, and the routine goes back to step S1. The image which has passed through the blank test (S5) goes to step S6 to decide whether the current DC image is the first image of the stabilization section.

That is, 'NS=1' implies start of the new scene. Here, the error E does not exceed the threshold value, which indicates the first I picture of the stabilization section.

It satisfies the standard that the thumbnail images are generated from the first I pictures of the stabilization sections of each scene.

In step S7, NS is reset as '0' in order to prevent the thumbnail images from the succeeding I pictures of the same section.

That is, when NS is set up as '0', the error E cannot reach into '1' until it is larger than the threshold value. Accordingly, only one thumbnail image can be generated from one scene section.

In the case that the current image is not the blank image, the thumbnail image is generated only from the first I picture of the stabilization section (S8).

While the invention has been shown and described with reference to certain preferred embodiments thereof it will be understood by those skilled in the art that various changes in form and details may be made therein without departing from the spirit and scope of the invention as defined by the appended claims.

What is claimed is:

1. A method for generating at least one thumbnail image from a plurality of consecutive frames in a video stream by an apparatus for generating thumbnail images, the method comprising:

selecting, by the apparatus for generating thumbnail images, a first frame and a second frame in a video stream, wherein the first frame is included at beginning of the first portion and the second frame is included at end of the first portion;

reducing, by the apparatus for generating thumbnail images, at least one of resolution and size of the first frame and the second frame to respectively generate a first reduced frame and a second reduced frame;

comparing, by the apparatus for generating thumbnail images, said first reduced frame with said second reduced frame to determine whether difference between the first reduced frame and the second reduced frame exceeds a first threshold; and selecting, by the apparatus for generating thumbnail images, a reduced frame from the first reduced frame and the second reduced frame, in response to determining that the difference between the first reduced frame and the second reduced frame does not exceed the first threshold, generating a thumbnail from the selected reduced frame.

2. The method of claim 1, wherein the first portion of the video stream is determined to be stable when the difference between the first reduced frame and the second reduced frame does not exceed the first threshold, such that the selected reduced frame is a visual representation of said plurality of frames in the first portion.

3. The method of claim 2, wherein there is a smooth transition between each frame in said plurality of frames in the first portion of the video stream.

4. The method of claim 1, wherein the selected reduced frame is determined to be blank, when the selected reduced frame does not provide a visual representation of an object that is recognizable by a human.

5. The method of claim 1, wherein the first frame and second frame are each an I-picture in an MPEG coded video stream.

6. The method of claim 1, wherein the first reduced frame and the second reduced frame are generated by applying a discrete cosine (DC) transform function to the first frame and the second frame, respectively.

7. The method of claim 1, wherein the selected reduced frame is at least one of the first frame or the second frame.

8. The method of claim 1, wherein when the difference between the first reduced frame and the second reduced frame exceeds the first threshold value, the selected reduced frame is selected from a second plurality of frames in a second portion of the video stream.

9. The method of claim 1, wherein determining whether the selected reduced frame is blank is further included and comprises:
    calculating a brightness average of the selected reduced frame; and
    comparing the brightness average with a brightness threshold value.

10. The method of claim 1, wherein determining whether the selected reduced frame is blank is further included and comprises:
    counting number of bright pixels in the selected reduced frame; and
    comparing the number of bright pixels with a threshold value.

11. A method for generating thumbnail images by an apparatus for generating thumbnail images, the method comprising:
    generating, by the apparatus for generating thumbnail images, a first DC image from a first I-picture and a second DC images from a second I-picture, wherein the first and second I-pictures are included in a first section of an MPEG coded video stream;
    comparing, by the apparatus for generating thumbnail images, said first and second DC images to determine a difference between the first and second DC images; and
    generating, by the apparatus for generating thumbnail images, a thumbnail image from at least one of the first and second DC images.

12. The method of claim 11, wherein the first section is stable, when the determined difference between the first and the second DC images is less than a first threshold.

13. The method of claim 12, wherein when the determined difference between the first and second DC images exceeds the first threshold value, the thumbnail is generated from a second section of the MPEG coded video stream.

14. The method of claim 11, further comprising determining that the thumbnail image is blank when the thumbnail image does not provide a visual representation of an object that is recognizable by a human.

15. The method of claim 11, wherein determining that the thumbnail image is blank is included and comprises:
    calculating a brightness average of the thumbnail image; and
    comparing the brightness average with a brightness threshold value.

16. The method of claim 11, wherein determining whether the thumbnail image is blank is included and comprises:
    counting number of bright pixels in the thumbnail image; and
    comparing the number of bright pixels with a threshold value.

17. A method for providing thumbnail images by an apparatus for generating thumbnail images, the method comprising:
    receiving, by the apparatus for generating thumbnail images, a digital input signal for generating a sequence of video images and first information;
    generating, by the apparatus for generating thumbnail images, at least a first image and a second image from the digital input signal, wherein the first and second images are included in the sequence of video images;
    processing, by the apparatus for generating thumbnail images, the first image and the second image to respectively produce a first reduced image and a second reduced image;
    comparing, by the apparatus for generating thumbnail images, the first reduced image with the second reduced image; and
    generating, by the apparatus for generating thumbnail images, at least one thumbnail image from one of the first or second reduced image displaying the thumbnail image in association with the first information.

18. The method of claim 17, further comprising saving the digital input signal and the thumbnail image in a storage medium.

19. The method of claim 17, wherein the digital input signal can be used to generate audio in addition to video.

20. The method of claim 17, further comprising determining whether there is a smooth transition between the sequence of video images based on a first value generated as a result of comparing the first reduced image with the second reduced image.

21. The method of claim 20, wherein there is a smooth transition between the sequence of video images, when the first value is less than a first threshold.

22. The method of claim 17, further comprising determining whether the thumbnail image is blank.

23. The method of claim 22, wherein the thumbnail image is blank, when the thumbnail image does not provide a visual representation of an object that is recognizable by a human.

24. The method of claim 22, wherein determining that the thumbnail image is blank comprises:
    calculating a brightness average of the thumbnail image; and
    comparing the brightness average with a brightness threshold value.

25. The method of claim 22, wherein determining whether the thumbnail image is blank comprises:
    counting number of bright pixels in the thumbnail image; and
    comparing the number of bright pixels with a threshold value.

26. The method of claim 20, wherein when the first value exceeds a first threshold value, the thumbnail is generated from a third reduced image not positioned between the first image and the second image in the sequence of video images.

27. The method of claim 17, wherein the first information comprises at least one of title information, program guide information, time information, summary information for a program, video format information and audio format information for the sequence of video images.

28. A method for generating one or more thumbnail images from a sequence of video images by an apparatus for generating thumbnail images, the method comprising:

generating, by the apparatus for generating thumbnail images, at least a first image and a second image from a first segment of a digital video stream;

processing, by the apparatus for generating thumbnail images, the first image and the second image to respectively produce a first reduced image and a second reduced image;

comparing, by the apparatus for generating thumbnail images, the first reduced image with the second reduced image to determine whether the first segment includes a stable sequence of video images; and generating, by the apparatus for generating thumbnail images, at least one thumbnail image from the sequence of video images in the first segment, in response to determining that: the first segment includes a stable sequence of video images; and the thumbnail image is not blank.

29. The method of claim 28, wherein the first segment includes a stable sequence of video images, when difference between the first reduced image and the second reduced image is less than a first threshold.

30. The method of claim 28, wherein the thumbnail image is not blank, when brightness average of the thumbnail image is less than a second threshold.

* * * * *